United States Patent [19]
Norrby

[11] Patent Number: 5,832,572
[45] Date of Patent: Nov. 10, 1998

[54] SAFETY HOOK AND LATCH PLATE THEREFOR

[76] Inventor: Henry Norrby, Öjevägen 69, Järvsö, Sweden, 820 40

[21] Appl. No.: 876,292

[22] Filed: Jun. 16, 1997

[30] Foreign Application Priority Data

| Jun. 26, 1996 | [SE] | Sweden | ................................. 9602524 |
| Dec. 17, 1996 | [SE] | Sweden | ................................. 9604625 |

[51] Int. Cl.$^6$ ............................. A44B 11/28; A44B 13/02
[52] U.S. Cl. ...................... 24/600.9; 294/82.2; 24/598.7
[58] Field of Search ............................. 24/601.3, 601.4, 24/600.9, 598.7, 598.4, 598.1, 265 EC, 265 H, 265 CD; 294/82.17, 82.19, 82.2

[56] References Cited

U.S. PATENT DOCUMENTS

| 108,024 | 10/1870 | Hotchkiss | ................................ 24/600.9 |
| 720,378 | 2/1903 | Phillips | ................................ 24/600.9 |
| 850,234 | 4/1907 | Lambert | ................................ 24/600.9 |
| 963,475 | 7/1910 | Schleicher | ................................ 24/600.9 |
| 978,656 | 12/1910 | Schleicher | ................................ 24/600.9 |
| 998,943 | 7/1911 | Armstrong | ................................ 24/600.9 |
| 1,300,078 | 4/1919 | Widstrand | ................................ 24/600.9 |
| 1,466,615 | 8/1923 | Falstrault | ................................ 24/600.9 |
| 1,499,932 | 7/1924 | Jacobson | ................................ 24/600.9 |
| 1,740,847 | 12/1929 | Wehringer | ................................ 24/598.7 |
| 1,878,291 | 9/1932 | Parsons | ................................ 24/600.9 |
| 3,046,630 | 7/1962 | Morrissey | ................................ 24/600.9 |

FOREIGN PATENT DOCUMENTS

| 136230 | 12/1919 | United Kingdom | ................. 24/600.9 |

*Primary Examiner*—Randolph A. Reese
*Assistant Examiner*—Robert J. Sandy
*Attorney, Agent, or Firm*—Young & Thompson

[57] ABSTRACT

A safety hook comprises a hook (1) having a cross piece (4) from which two side pieces (5, 5') extend in the direction forwards to a curved part (7, 7'), as well as a latch plate (2) which is connectable to the side pieces of the hook so as to resiliently abut against the inside thereof. The latch plate (2) is thin and elastically deformable and has two recessions (9, 9') opening outwards for receiving of portions of the side pieces (5, 5') of the hook in order to connect the plate therewith.

7 Claims, 3 Drawing Sheets

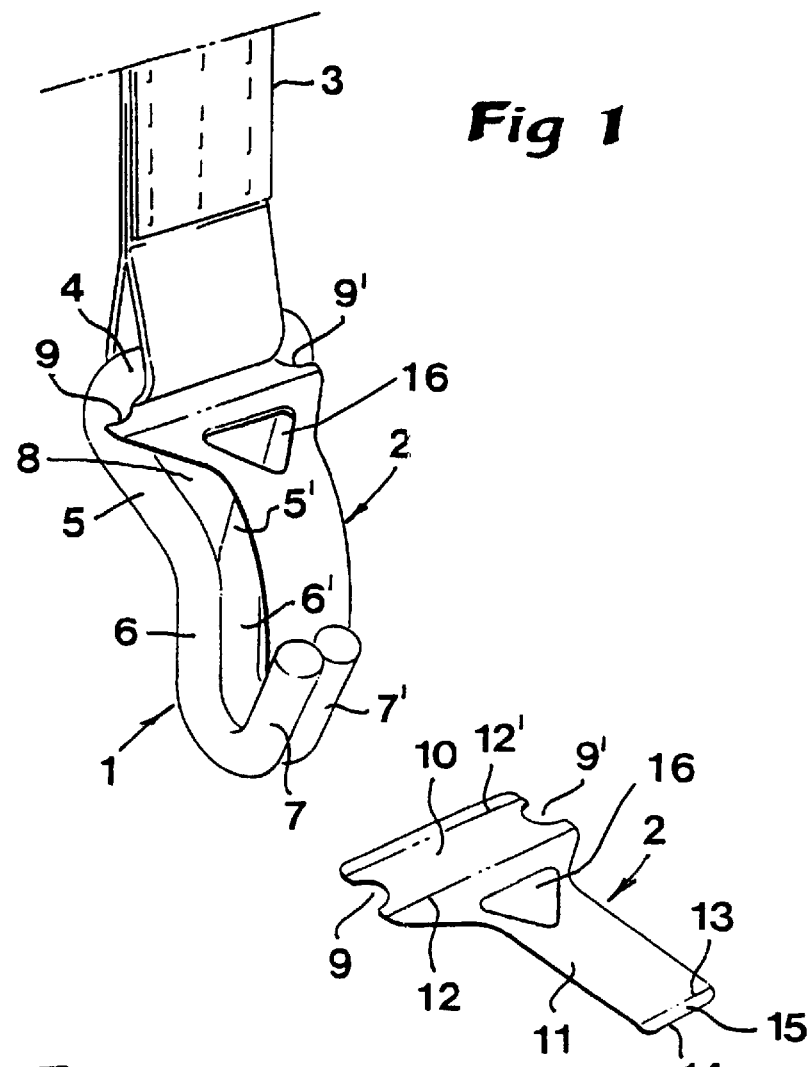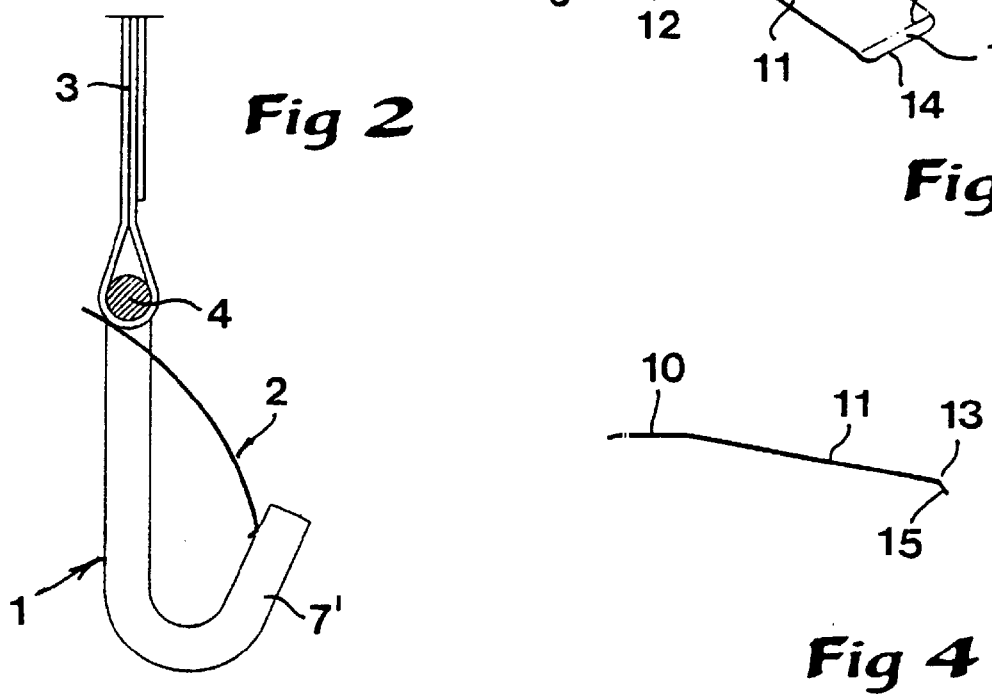

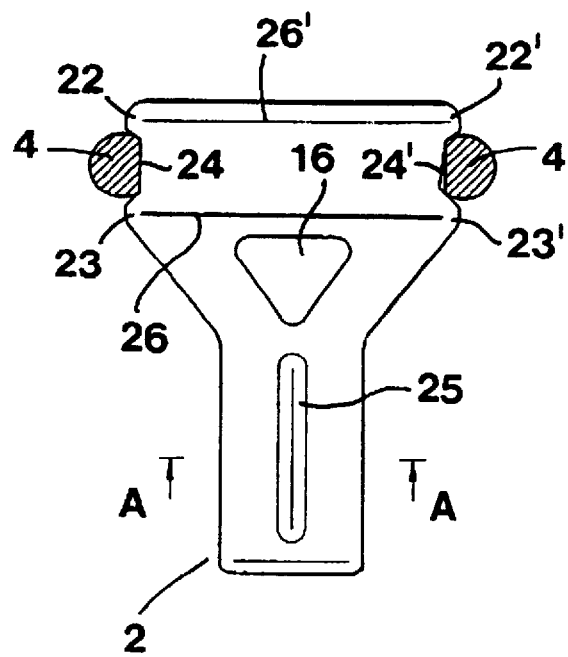
Fig 8
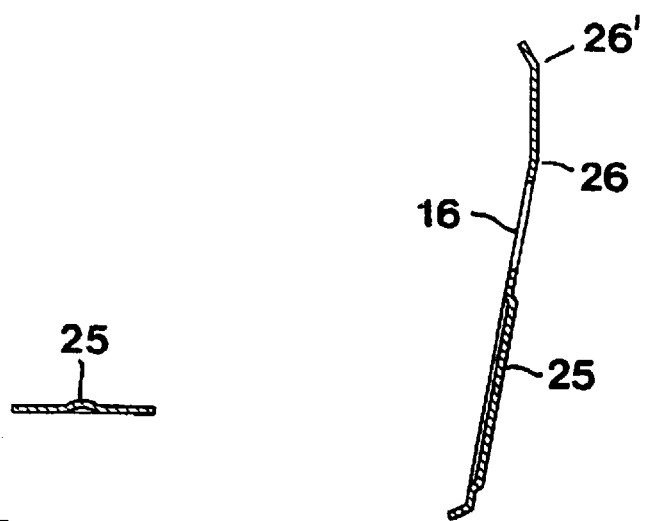
Fig 9
Fig 10

SAFETY HOOK AND LATCH PLATE THEREFOR

TECHNICAL FIELD OF THE INVENTION

In a first aspect, this invention relates to a safety hook of the kind which includes a proper hook which has a rear cross piece intended for connecting a strap or the like from which two side pieces extend in the direction forwards to a curved part, as well as a latch plate which is connected to the side pieces of the hook and abuts resiliently against an inside of the curved part.

BACKGROUND OF THE INVENTION

Safety hooks of the above-mentioned kind are used for fastening the ends of straps possible to tighten in fastenings such as rings, loops and the like. Such fastenings may be found on trailers, platform bodies or the like. Unlike simple hooks without latch plates, a safety hook guarantees a reliable retention of the hook by the appurtenant fastening even if the strap peradventure would be slacken. A common type of hook is made of one single continuous bar piece which is mechanically bent while forming a rear cross piece, two side pieces converging forwardly therefrom as well as two end portions located side by side close to each other, which are curved to jointly form a free hook part.

In previously known safety hooks, the latch plate consists of a relatively thick, stiff metal plate which at the rear end thereof is united to a particular pivot pin which is inserted in holes in the side pieces of the hook. The plate cooperates with a particular spring in the form of a wire spring in order to keep the plate resiliently abutted against the free hook part. A disadvantage of such safety hooks is that the desired safety function gives rise to relatively large manufacturing costs in that no less than three different components (latch plate, pivot pin and spring) are required. Furthermore, machining of the hook as such is required, viz. forming the holes for the pivot pin. Another disadvantage of previously known safety hooks is that the latch plate is not movable in another way than by pivoting from the inside of the free hook part towards the side pieces behind. Therefore, the latch plate is, in the mounted state thereof, positioned very close to said side pieces and the cavity which is delimited therebetween. Therefore, unlike the simple hooks which lack a latch plate, a safety hook may in practice not be used for application on a hook or a hook-like part of the kind which is found, e.g., on the outside of the side flaps of trailers.

OBJECTS AND FEATURES OF THE INVENTION

The present invention aims at obviating the above-mentioned disadvantages of previously known safety hooks and at creating an improved safety hook. Thus, a primary object of the invention is to create a safety hook which in its entirety is extremely simple and cheap to manufacture. A further object is to create a latch plate intended for hooks which does not require particularly formed or machined hooks for the mounting thereof. In other words, the latch plate should be able to be applied on simple standard hooks either in connection with the manufacture or afterwards. A further object is to create a safety hook and a latch plate which may be easily pivoted out from an actively blocking position to an inactive state in which the proper hook may be applied to another hook. Another object is to create a safety hook particularly suitable for wide straps, the latch plate of which has a sufficiently large stiffness in a rear, wide base part to guarantee a reliable retention between the side pieces of the hook, as well as a front, narrow part which is resiliently abuttable against the inside of the curved part of the hook, more precisely with a spring force which keeps the front part of the plate abutted against the curved part of the hook with a pressure suitable for the purpose. A further object of the invention is to enable a manufacturing of a safety hook presenting the desired characteristics by using simple and cheap means.

According to the invention, at least the primary object is attained by the features defined in claim 1. Preferred embodiments of the invention are furthermore defined in the dependent claims 2–7.

In a particular aspect, the invention also relates to a latch plate as such. The features of the latch plate according to the invention are evident from claims 8 and 9.

BRIEF DESCRIPTION OF THE APPENDED DRAWINGS

In the drawings:

FIG. 1 is a perspective view of a safety hook attached to a strap according to a first embodiment of the invention, FIG. 2 is a section through the safety hook according to FIG. 1, FIG. 3 is a perspective view of a latch plate included in the hook according to FIGS. 1 and 2, FIG. 4 is a side view of the latch plate according to FIG. 3, FIG. 5 is a perspective view a safety hook according to an alternative embodiment of the invention, a latch plate included therein being shown in a bent, resilient state, FIG. 6 is a planar view of the latch plate included in the hook according to FIG. 5 in a plane, non-resilient state in which said plate, however, is shown mounted between two side pieces included in the hook illustrated in cross-section, FIG. 7 a longitudinal section through the latch plate according to FIG. 6, FIG. 8 is a planar view corresponding to FIG. 6 showing a third alternative embodiment of the latch plate, FIG. 9 is a cross-section A—A in FIG. 8, and FIG. 10 is a longitudinal section through the latch plate according to FIG. 8.

DETAILED DESCRIPTION OF PREFERRED EMBODIMENTS OF THE INVENTION

Figure 5:
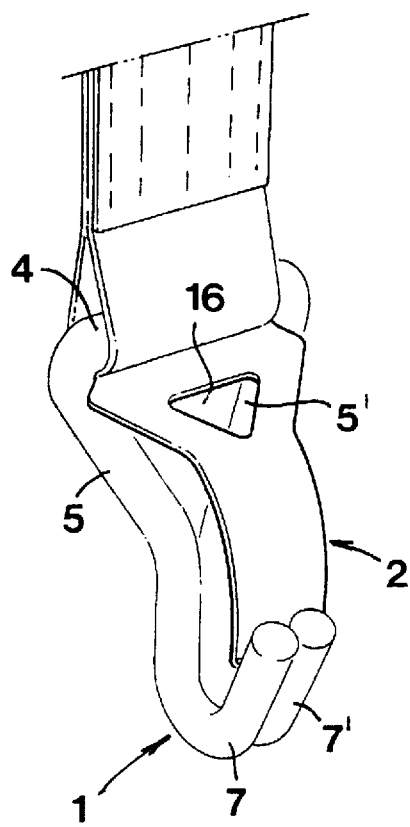

The safety hook shown in FIGS. 1 and 2 comprises a hook in its entirety designated 1 as well as a latch plate 2. The hook 1 is shown connected to a strap 3, e.g. of the kind which is used to tighten the load on a trailer or a platform of a vehicle. The hook 1 is made of one single bar piece which has been bent in such a way that said bar piece has come to comprise a rear cross piece 4, two side pieces 5, 5' extending from the opposite ends thereof, said side pieces converging in the direction towards bar portions 6, 6' lying in close contact with each other. Said bar portions are bent while forming curved, free end portions 7, 7' which jointly form the proper hook part of the hook 1. In practice, the bar is usually so powerfully dimensioned that the portions 6,6' and 7, 7' respectively are reliably kept together without using particular connection means. However, it may occur that said bar portions are mutually connected by means of one or several spot weldings.

It should be further noted that a triangular cavity 8 is delimited between the converging side pieces 5, 5'.

The proper hook, such as shown in the drawing and described above, is previously known in the form of a conventional, simple standard hook.

New according to the present invention, is the latch plate 2. Characteristic for said plate is that it is narrow and elastically deformable and has two recessions 9, 9' opening outwards for receiving portions of the side pieces 5, 5' of the hook in order to connect the plate therewith. In the example shown, plate 2 comprises a rear, relatively wide portion 10 and a narrower front portion 11 the width of which mainly corresponds with the width of the free end portions 7, 7' of the hook. The recessions 9, 9' are provided in the side edges of the wide, rear plate portions 10 and open at diametrically opposite directions.

In practice, the plate is most suitably made by punching and bending a sheet of spring steel which, when the hook is intended for moderately wide straps (35 mm), may have a thickness of 0,3–0,7 mm. According to a preferred embodiment of the invention, at least a first bending line 12 is formed in said sheet in connection with the recessions 9, 9' in the rear, wide sheet portion. A second bending line 12' is also provided in the rear, wide sheet portion, more precisely on the opposite side of the recessions in the example shown. The purpose of the bending lines 12, 12' is to contribute to the plate being returned to a plane state, after deformation to a cross-section-wise arc-shaped state in connection with the mounting on the hook.

A third bending line 13 is formed in the narrow, front sheet portion 11, more precisely at a relatively short distance from the free edge 14 of said sheet portion. The bending line 13 delimits a short, front sheet portion 15 which is oblique at a certain angle relative to the sheet portion 11 as such.

In the continued description, the side of the latch plate which is seen in FIG. 3 is denominated the outside, while the opposite side is denominated the inside.

A through hole 16 is recessed in the plate 2 in the area between the wider rear part 10 and the narrower front part 11. The structure and function of through hole 16 is described in more detail hereinafter with respect to the embodiment illustrated in FIGS. 5 to 10.

The Function of the Invention

When mounting the latch plate 2 on the hook 1, the plate is bent transverse the length extension thereof, more precisely in such a way that the outside of the plate obtains a concave shape. This bending of the plate may in practice be done with a tool (not shown) specially formed for the purpose. The bending is carried so far that the distance between the side edges of the wide sheet portion 10 becomes somewhat smaller than the distance between the insides of the widest portions of the side pieces 5, 5', whereby the wide sheet portion may be inserted between said side pieces. When this is done, the tool is brought to let the sheet go, said plate, as a consequence of the inherent elasticity thereof, automatically being returned to the form shown in FIG. 3. The return to said plane shape is highly facilitated by the two straight bending lines 12, 12' on both side of the recessions 9, 9'.

After mounting the latch plate fixed on the hook, the plate is bent again, more precisely length-wise so that the free end portion of the plate may be put inside of the outer hook part 7, 7' in the way shown in FIGS. 1 and 2. Thanks to the bent-in, free end portion 15, the proper edge 14 will not abut with a springing pressure directly against the inside of the bar portions 7,7'. This means that the proper edge 14 does not cut into possible irregularities, e.g. burrs or the like, in said bar portions.

When the hook is to be applied in a fastening, e.g. a ring, the hook part 7, 7' is hitched in the fastening, the elastic latch plate simply springing away. When the hook is to be removed from the fastening, the plate 2 is pressed in manually towards the bar portions 6, 6' being behind, and then the fastening may pass freely between the free edge of the plate and the inside of the hook part 7, 7'.

A substantial advantage of the invention is that the desired latch or safety function may be obtained by only one single and simple component which is cheap to produce and mount. A particular advantage is that the latch plate may be mounted afterwards on standard hooks. Another advantage is that the latch plate, in the mounted state between the side pieces 5, 5', may be released from the contact with the hook part 7, 7', viz. by being, against a certain spring pressure, bent and swung out from the hook part. In this swung-out state, the latch plate does not obstruct that another hook is inserted through the triangular cavity 8 between the side pieces 5, 5'. In other words, the safety hook according to the invention may, without obstacle, be used also for hitching at another hook which is stuck in through the cavity.

In the embodiments shown in FIGS. 5 to 10, a through hole 16 is recessed in the plate 2, more precisely in the area between the wide rear part 10 and the narrower front part 11. At the same time, the plate is made of a sheet, preferably spring steel sheet, which is thicker than the 0,3–0,7 mm thick sheet which is used in the preceding embodiment for narrow straps. Thus, the thickness of the plate 2 may be within the range of 0,7–1,5 mm. In practice, a thickness of 0,8–1,0 mm is preferred in latch plates for such safety hooks which are intended for straps having a width of 50 mm or more. By this choice of thickness of the sheet, the rear base part 10 obtains a sufficient stiffness after the mounting between the side pieces 5, 5' of the hook, so as to be reliably retained therebetween. However, by the existence of the hole 16, a satisfying resilience ability of the front, narrow part 11 of the latch plate is simultaneously guaranteed. Thus, by the hole 16, the total cross-section area is reduced in the intermediate part delimited between the oblique edge portions 17, 17' and which form a transition portion between the front part 10 and the rear part 11, whereby the flexural rigidity of said intermediate part is reduced to such an extent that the front part 10 of the plate will spring with a suitable force.

In the shown, preferred embodiments, the hole 16 is made with a form narrowing in the direction forwards. More precisely, the hole is in the form of an isosceles triangle. Advantageously, the angle between the edge portions 17, 17' is chosen so that said portions mainly become parallel with the two forwardly converging edges 18, 18' delimiting the hole 16.

By choosing an appropriate size of the hole 16, the total flexural rigidity of the two sheet portions separated by the hole may be reduced in a predetermined way to the extent that the spring force or spring constant becomes appropriate for the individual application case.

Figure 6:
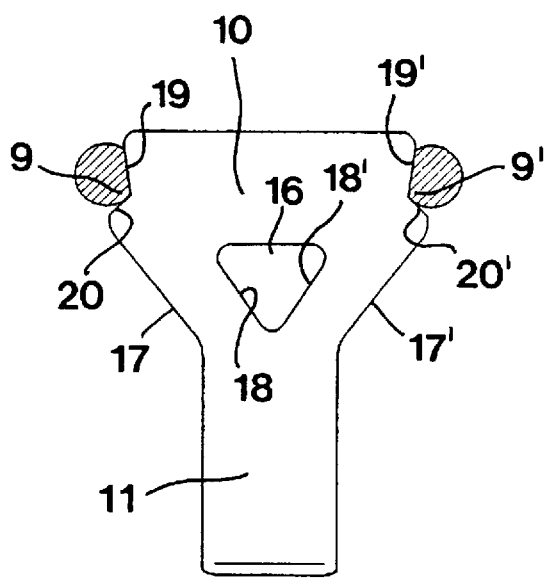

When producing the proper hook, the insides of the portions of the bar forming the side pieces 5, 5' may be at least partly flattened, more precisely by the fact that the inside of the bar is pressed against a core or frame part which determines the shape of the hook. Thus, in FIG. 6 is shown how the bar side pieces 5, 5' have internal, flattened surfaces which in this example extend obliquely in relation to each other. Therefore, in this case, the recessions 9, 9' of the base part of the latch plate are delimited between oblique edge portions 19, 20 and 19', 20' respectively, in a wedge-like way. In other words, the recessions are wedge-shaped instead of semi arched-shaped as in the embodiment according to FIGS. 1 to 4.

Figure 7:
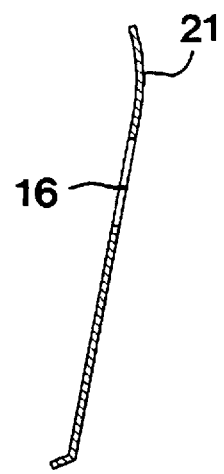

Another difference compared to the latch plate according to FIGS. 1 to 4 is that the base part of the latch plate is arch-shaped section-wise as shown at 21 in FIG. 7. This vaulted shape fulfils the same function as the bending lines 12, 12' according to FIG. 3. In comparison with bending lines, the vaulted shape has the advantage that the risk of plastic deformation in connection with mounting is reduced to a minimum.

In FIGS. 8 to 10, an alternative embodiment of the invention is shown, according to which the recessions for the receipt of the side pieces 5, 5' are delimited between pairs of axially separated projections 22, 23 and 22', 23' respectively. In this case, the insides of the two side pieces 5, 5' are delimited by plane, flattened surfaces which are mutually substantially parallel. Between the two projections 22, 23, an edge portion 24 extends which is mainly parallel to the axial extension of the latch plate, and which therefore, in a mounted state thereof, in the main, completely abuts against the flattened surface on the inside of the side piece 5. Also the opposite recession is delimited by a straight edge portion 24' between the projections 22' and 23'. However, in this case, the straight edge portion 24' is somewhat oblique (e.g. at an angle of 5°) relative to the axial extension of the latch plate. By this obliquity of the edge portion, the insertion of the base part 10 between the side pieces in connection with mounting the latch plate on the hook is facilitated.

Furthermore, in the narrow, front part 11 of the latch plate, a bead 25 extending axially is stamped, the purpose of which is to at least partially stiffen this part of the plate. In this embodiment, the plate part 11 keeps, in all essentials, the original plane and straight shape also in a mounted state, the requisite resilience ability in the plate, in the main, being solely obtained by bending the plate in the narrowing intermediate portion between the part 11 and the rear, wide base part 10.

It should also be noted that the latch plate according to FIGS. 8 to 10 is formed with two bending lines 26, 26' extending between the opposite recessions for the side pieces of the hook.

By forming the latch plate with at least one hole in the way described above, the plate may, on one hand, be made of a sufficiently thick sheet to guarantee a good stiffness in the rear wide base part which is crucial for the plate's ability to be retained between the side pieces of the hook, and, on the other hand, in an intermediate portion retain a sufficient elastic flexibility in order to guarantee the desired spring pressure in the front part of the plate which is to abut against the inside of the bent part of the hook.

Feasible Modifications of the Invention

The invention is not solely restricted to the embodiments described above and shown in the drawings. Thus, it is feasible to make the plate with two or more holes instead of only one. Furthermore, the narrow front part of the latch plate does not necessarily need to be substantially rectangularly formed. Thus, the latch plate may gradually narrow from the rear wide base part towards the area of the front end of the plate.

I claim:

1. A safety hook comprising a proper hook (1), which has a rear cross piece (4) intended for connecting a strap (3) from which two side pieces (5, 5') extend in the direction forwards to a curved part (7, 7'), as well as a latch plate (2) which is connected to the side pieces of the hook and abuts resiliently against an inside of the curved part, wherein the latch plate (2) is thin and elastically deformable and has two recessions (9, 9') opening outwards for receiving portions of the side pieces (5, 5') of the hook in order to connect the plate therewith, wherein the recessions (9, 9') are formed in a rear part (10) of the plate which is wider than a front part (11), and wherein at least one through hole (16) is recessed in the latch plate (2) in the area between said parts (10, 11), the purpose of which hole is to reduce the stiffness of the plate in said area so as to guarantee a good resilience ability in the front part of the plate in spite of a relatively large thickness of material of the plate.

2. A safety hook according to claim 1, wherein the latch plate (2) has, in the area of said recessions (9, 9'), at least one bending line (12) the purpose of which is to contribute to return the plate to a plane state after deformation to a cross-section-wise arc-shaped state in connection with mounting the plate on the hook.

3. A safety hook according to claim 1, wherein the latch plate, in the area of the free end thereof distanced from the recessions (9, 9'), has an end portion (15) bent at an angle against a main plane of the plate for touching against the inside of the curved part (7, 7') of the hook.

4. A safety hook according to claim 1, wherein the rear part (10) of the latch plate at least partially has a vaulted shape (21).

5. A safety hook according to claim 1, wherein the hole (16) narrows in the direction forwards towards the front part (11) of the latch plate.

6. A safety hook according to claim 1, wherein a bead (25) extending axially is stamped in the front part (11) of the latch plate (2), the purpose of which bead is to stiffen this part of a plate.

7. A latch plate for safety hooks of the kind which comprises a proper hook having a rear cross piece (4) intended for connecting a strap from which two side pieces (5, 5') extend in the direction forwards to a curved part (7, 7'), wherein said latch plate is thin and elastically deformable and has two recessions (9, 9') opening outwards for receiving portions of side pieces (5,5') of the hook in order to connect the plate therewith, and further comprising a front part (11) which is more slender than a rear part (10) in which the recessions (9, 9') are formed, wherein at least one through hole (16) is recessed in the area between the front, slender part (11) and the rear, wider part (10), the purpose of which hole is to reduce the stiffness in this area of the plate so as to guarantee a good resilience ability in the front part of the plate in spite of a relatively large thickness of material of the plate.

* * * * *